Patented May 27, 1941

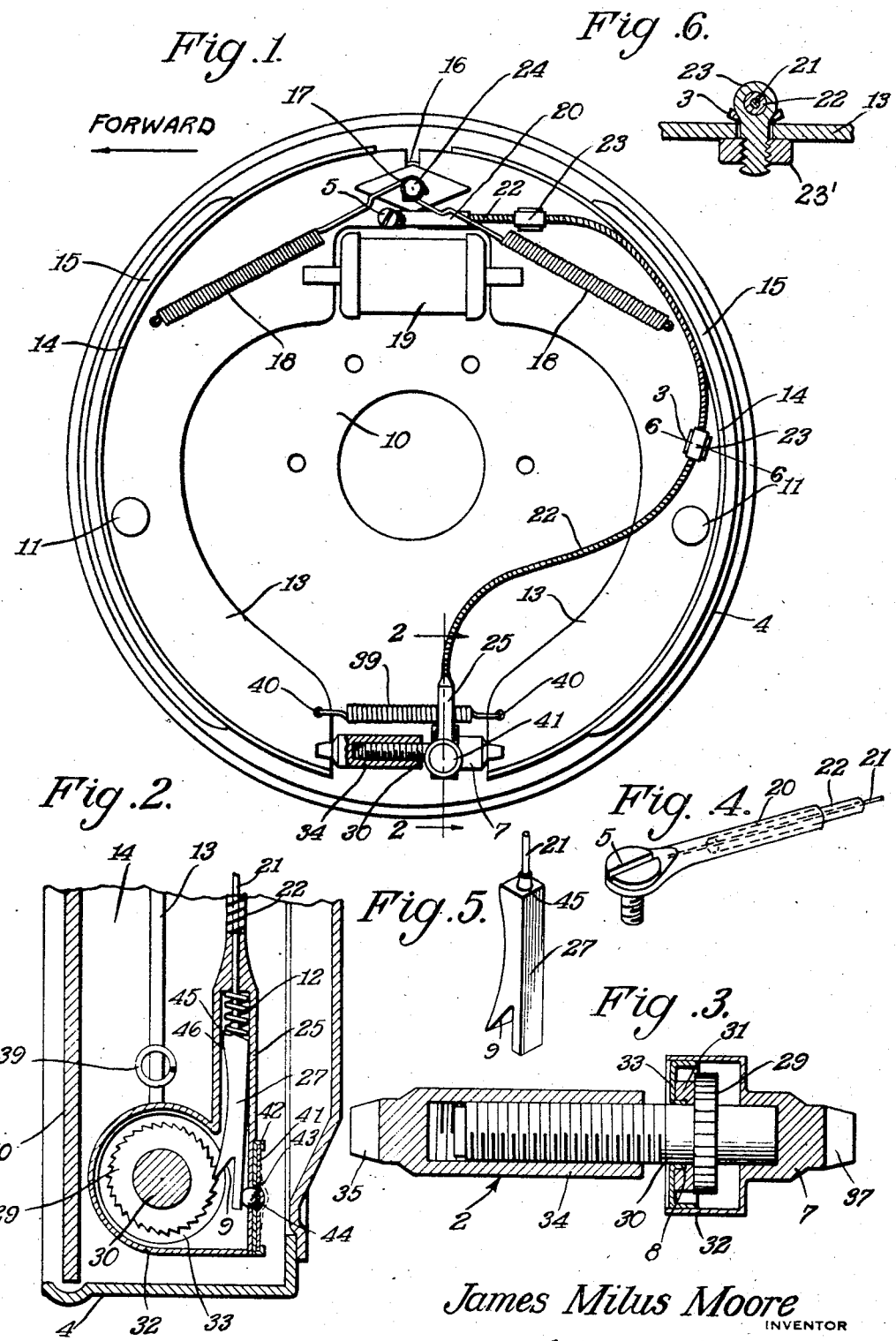

2,243,469

UNITED STATES PATENT OFFICE 2,243,469

SELF-ADJUSTING BRAKE SHOE

James Milus Moore, San Diego, Calif., assignor of forty-nine per cent to Paul Wood, San Diego, Calif.

Application September 23, 1940, Serial No. 358,000

2 Claims. (Cl. 188—79.5)

This invention relates to self-adjusting brake shoes. Ordinarily to adjust brake shoes of motor vehicle brakes the cover is removed from the backing plate and a special tool is inserted to turn the adjusting assembly ratchet wheel in an expanding direction. This moves the shoes outwardly toward the brake drum and restores their original position relatively to the drum.

The present invention has for an object to obviate this manual operation of adjusting brake shoes and to accomplish this purpose provides an adjuster which is controlled directly by the brake shoe movement, the adjuster controlling the shoe in relation to the amount of brake shoe movement when the brakes are applied and released.

Another object is to provide a simplified pawl and ratchet device co-acting with the adjusting assembly ratchet wheel, and a control cable connected to the device and connected to the primary brake shoe at the opposite end of the shoe from the device to initiate adjusting movement of the device at a point remote from the device so that the brake shoes will be automatically adjusted to take up wear by what might be called remote control apparatus.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a front elevation of self-adjusting brake shoes constructed in accordance with the invention.

Figure 2 is a cross sectional view taken on the line 2—2 of Figure 1 showing the ratchet, pawl and thermic diaphragm.

Figure 3 is an enlarged longitudinal sectional view of the adjusting device.

Figure 4 is a detail perspective view of the flexible control cable and means for attaching the cable to the primary brake shoe.

Figure 5 is a perspective view of the pawl.

Figure 6 is a detail cross sectional view taken on the line 6—6 of Figure 1.

Referring now to the drawing in which like characters of reference designate similar parts in the various views, a conventional motor vehicle brake is shown, comprising a brake drum 4, a backing plate 10 having loosely fitted washer lock pins 11 engaged through the intermediate portions of the webs 13 of floating brake shoes 14 having brake linings 15. A stationary bearing 16 secured to the backing plate and the upper ends of the webs of the brake shoes are loosely engaged against the bearing. An anchor pin 24 is secured to the bearing and is provided with a groove 17 to receive the upper ends of the brake shoe return springs 18. The lower ends of the springs are secured to the brake shoe webs. A fluid pressure operating means 19 is disposed below the stationary bearing 16 and engages the upper ends of the webs of the brake shoes to move the shoes outwardly to apply the brakes. These parts are conventional.

In carrying out the invention a sleeve 20 is pivotally secured to the web of the primary brake shoe above the fluid pressure supplying means by a shoulder screw 5 and the upper end of a flexible control cable 21 is secured to the sleeve as shown in Figure 4. The cable is mounted in a flexible casing 22 which is secured to the web of the secondary brake shoe by eye bolts 23 and nuts 23'. Curved spacing washers 3 are disposed between the flexible casing and the web of the secondary brake shoe.

A small tubular housing 25 is disposed in spaced relation to the backing plate near the lower ends of the brake shoes and is secured to the lower end of the casing 22 by swaging the housing and is provided with a rectangular bore which slidably receives a pawl 27 of similar cross section. The pawl is loosely fitted in the housing and is secured to the lower end of the control cable.

A helical compression spring 12 is mounted in the housing between the pawl and the top of the housing and is under sufficient compression to turn the ratchet wheel each time the control cable 21 is released. A ratchet wheel 29 is fixed to the bolt 30 which is engaged in the internally threaded cylinder 34 of a conventional adjusting assembly 2, shown best in Figure 3. The ratchet wheel is engaged by a spur 9 on the pawl 27 and is housed within a substantially cylindrical housing 32 which is formed integral with the bottom of, and communicates with, the small housing 25. A flanged disk 33 closes the open end of the housing 32 and is provided with a hub 8 which forms a bearing for the bolt 30. A grease retaining washer 31 is disposed between the disk 33 and the ratchet wheel 29.

The cylindrical housing 32 is provided with an axial extension 7 which is bored to receive the adjacent smooth end of the bolt 30 and is provided with a kerf 37 to receive the lower end of the web of the secondary brake shoe. The internally threaded sleeve 34 is provided with a kerf 35 adapted to receive the lower end of the web of the primary brake shoe. A helical spring 39 is provided with hooked ends which are engaged through orifices 40 formed in the lower end of the webs of the brake shoes near the adjusting assembly 2. The spring holds the adjusting assembly in its proper place by pulling the brake shoes toward each other.

A thermic diaphragm 4 is attached to the small housing 25 by crimping as shown at 42. Suitable materials for constructing the thermic diaphragm are silver, aluminum, "Durell," copper or bronze combined with "Swedish steel." An opening 43 is formed in the center of the diaphragm and receives a metal ball 44. The ball engages the pawl 27 below the spur 9 and transmits diaphragm pressure to the pawl to hold the pawl engaged with the ratchet wheel 29.

In operation when the brakes are applied, the brake shoes move outward away from the anchor pin. This pulls the flexible cable 21 and sleeve 20 assembled therewith a given distance out from the flexible casing 22 to raise the pawl 27 and compress the helical spring 12 between the pawl and the housing. When the brakes are released, the brake shoes move back to their respective position against the anchor pin 24. This movement of the shoes should never vary if the shoes are kept properly adjusted. When the shoes return to their normal position, as previously stated, the control cable 21 and sleeve 20 are released and permit the helical spring 12 to expand and move the pawl 27 to turn the ratchet wheel 29 and which screws the threaded bolt 30 in an outward direction out of the cylinder 34 of the adjusting assembly 2, to automatically take up wear on the brake linings.

The purpose of the thermic diaphragm is to govern the pressure of the ball 44 on the pawl 27 under excessive heat conditions. At a pre-determined degree of heat the thermic diaphragm expands outwardly, as shown by the dotted line in Figure 2, and releases excessive pressure of the steel ball on the pawl. The pawl it will be pointed out is provided with a sloped upper end 45 so that the spring 12 exerts more pressure on one side of the pawl than on the other to lift the pawl to by-pass the ratchet wheel teeth freely. The pawl is provided below the top surface with a bearing surface 46 which engages the housing 25 on the side of the pawl opposite from the ball 44.

When the brakes need adjusting, and in order for this device to make an adjustment, the brakes must be applied and completely released. The pawl is adjusted in relation to the ratchet wheel, after the mechanism has been installed. This adjustment is accomplished by loosening the nuts on the eye bolts 23 and by moving the conduit 22 toward the sleeve to lower the pawl out of the sleeve or by moving the conduit 22 from the sleeve to raise the pawl.

From the above description it is thought that the construction and operation of the invention will be fully understood without further explanation.

What is claimed is:

1. In brake mechanism having a stationary backing plate, primary and secondary brake shoes floating on the backing plate, means connected to the upper ends of the brake shoes for setting and releasing the brake shoes, an adjusting assembly between the lower ends of the brake shoes formed of telescopically assembled screw-threaded members, and a spring connected to the brake shoes to hold the adjusting assembly in place, the combination of a ratchet wheel on one of the adjusting assembly members for moving the members relatively to each other in a rectilinear direction to increase the effective length of the adjusting assembly, a housing, a pawl slidably mounted in the housing engaging the ratchet wheel, a flexible control cable connected at one end to the pawl and connected at the other end to the primary brake shoe remote from the adjusting assembly, and a helical compression spring in the housing above the pawl, said cable being responsive to movement of the brake shoes when the brakes are applied to raise the pawl and compress the helical spring, said helical spring moving the pawl to turn the ratchet wheel when the cable is released by release of the brake to automatically adjust the brake shoes.

2. In brake mechanism having a stationary backing plate, primary and secondary brake shoes floating on the backing plate, means connected to the upper ends of the brake shoes for setting and releasing the brake shoes, an adjusting assembly between the lower ends of the brake shoes formed of telescopically assembled screw-threaded members, and a spring connected to the brake shoes to hold the adjusting assembly in place, the combination of a ratchet wheel on one of the adjusting assembly members for moving the members relatively to each other in a rectilinear direction to increase the effective length of the adjusting assembly, a housing, a pawl loosely and non-rotatably mounted in the housing, a thermic diaphragm on the housing, a ball carried by the diaphragm holding the pawl engaged with the ratchet wheel, a helical compression spring in the housing confined under tension between the top of the pawl and the housing, heat expansion of the thermic diaphragm permitting the helical spring to release the pawl from engagement with the ratchet wheel, a control cable entering the housing and connected to the pawl, a casing for the control cable secured to the secondary brake shoe, a sleeve on the upper end of the control cable, a shoulder screw pivotally securing the end of the sleeve to the upper end of the primary brake shoe, said control cable being responsive to movement of the brake shoes when the brakes are set to pull up the pawl and compress the helical spring, said control cable being responsive to movement of the brake shoes when the brakes are released to permit the helical spring to expand and move the pawl to turn the ratchet wheel for automatically adjusting the brakes.

JAMES MILUS MOORE.